United States Patent [19]
Garbagnati

[11] Patent Number: 5,890,583
[45] Date of Patent: Apr. 6, 1999

[54] MAGNETIC CURVE HAVING AN IMPROVED DETACHABLE STRUCTURE

[75] Inventor: Carlo Garbagnati, Castello Brianza, Italy

[73] Assignee: Regina Sud S.P.A., Latina, Italy

[21] Appl. No.: 754,127

[22] Filed: Nov. 22, 1996

[30]     Foreign Application Priority Data

Nov. 24, 1995  [IT]  Italy ................................ MI950814 U

[51] Int. Cl.[6] .................................................. B65G 15/60
[52] U.S. Cl. ............................................................ 198/805
[58] Field of Search ............................................. 198/805

[56]              References Cited

U.S. PATENT DOCUMENTS

| | | | |
|---|---|---|---|
| 4,643,298 | 2/1987 | Wallaart . | |
| 4,742,906 | 5/1988 | Wallaart | ................................ 198/805 |
| 4,805,764 | 2/1989 | Van Zijderveld, Jr. | ................ 198/805 |
| 5,199,551 | 4/1993 | Wallaart et al. | ........................ 198/805 |

FOREIGN PATENT DOCUMENTS

| | | |
|---|---|---|
| 325333 | 7/1989 | European Pat. Off. . |
| 509605 | 10/1992 | European Pat. Off. . |
| 2037690 | 12/1982 | United Kingdom ................... 198/805 |
| 9321090 | 10/1993 | WIPO . |

Primary Examiner—Joseph E. Valenza
Assistant Examiner—Joe Dillon, Jr.
Attorney, Agent, or Firm—Stevens, Davis, Miller & Mosher, L.L.P.

[57]              ABSTRACT

A magnetic curve for a chain conveyor having links at least partly made of a ferromagnetic material, comprises a base portion (11) to which an upper guide portion (12) identifying surfaces for the conveyor sliding is fastened. Magnets (17) are present at the lower part of the slide surfaces for attracting the links against said surfaces. Said magnets (17) are fastened to the base portion (11) and advantageously are made up of pairs of magnets (17a, 17b) mutually interconnected, at the lower part, by a plate (19) of a ferromagnetic material securing them to the base (11).

7 Claims, 1 Drawing Sheet

MAGNETIC CURVE HAVING AN IMPROVED DETACHABLE STRUCTURE

BACKGROUND OF THE INVENTION

The present invention relates to a magnetic curve for chain conveyors.

Chain conveyors are known which are formed of a track having a central channel in which the articulation pivots of the conveyor link slide. In order to keep the links adhering to the track on bends as well, it has been since long suggested to provided the trank curves with magnets. Magnets act on the link portions made of a ferromagnetic material so as to counteract the lifting forces and keep the link plane adherent to the track.

Providing the track curves with magnets, however, makes accomplishment of same more complicated. For instance, magnetic curves have been proposed in which the curve is divided into two parts, an upper or slide part and a lower or base part. The upper part is comprised of seatings to which magnets are fixedly fastened. Fitting of the magnets into appropriate seatings and fastening of same thereto at the exact position, however, is in any case a relatively long and difficult operation.

For example, in the U.S. Pat. No. 4,643,298 seatings are disclosed which are open at the lower part thereof, i.e. the slide one, the magnets being fixed to the respective seatings by means of a strip of flexible material which is snug fitted into the opening of the seatings themselves.

In addition to difficulties encountered on the initial assembling, it is also to take into account the fact that curves are subjected to wear due to sliding thereon of the conveyor and therefore a periodical dismantling of the worn curves is needed for replacing them with new curves. Although a curve completed with magnets and accessory pieces for keeping magnets inside the respective seatings is relatively expensive, the operation involving opening of the seatings, drawing of magnets out and reassembling of same on the new curve is greatly time-consuming, which often makes reuse of said magnets uneconomic. In both cases therefore, that is if magnets are reused or if the whole curve is replaced, the maintenance expenses for the transportation system is relatively high.

In the Italian patent No. 1,215,730 it has been proposed, among other things, to create seatings which are open inwardly of the sliding channel in the track, said openings being covered with strips which advantageously perform an antifriction function. In spite of the advantages offered by this solution, magnet reuse is still a rather complicated operation.

It is a general aim of the present invention to eliminate the above-mentioned drawbacks by providing a magnetic curve capable of making both the initial assembling and the replacement of the worn out sliding parts simple and economically advantageous, through reduction of the assembling and disassembling time and of the number of disassembled parts to a minimum.

SUMMARY OF THE INVENTION

In view of the above aim, in accordance with the invention, a magnetic curve for a chain conveyor having links at least partly made of a ferromagnetic material has been devised, which comprises a base portion to which an upper guide portion identifying surfaces for the conveyor sliding is fastened, magnets being provided at the lower part of the slide surfaces for attracting the links against said surfaces, characterized in that the magnets are fastened to the base portion.

BRIEF DESCRIPTION OF THE DRAWINGS

To further clarify the explanation of the innovatory principles of the present invention and the advantages it offers over the known art, a possible embodiment of the invention practically accomplishing said principles will be taken hereinafter, by way of non-limiting example, with the aid of the accompanying drawings, in which.

DETAILED DESCRIPTION OF THE INVENTION

Figure 1:
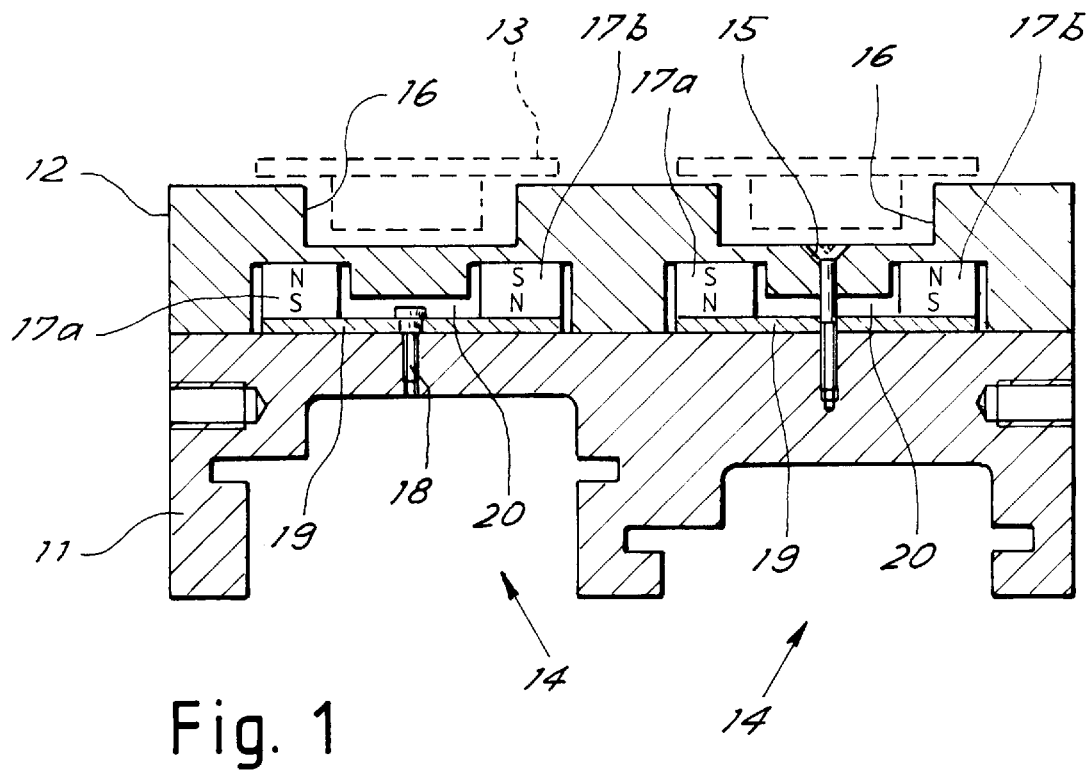
FIG. 1 is a sectional view of a curve in accordance with the invention taken along line II—II in FIG. 2.

With reference to the drawings, a curve made in accordance with the invention is shown and it is generally denoted by 10.

The curve herein shown is a double-track curve, but clearly the case of a similar curve embodied as a single-track curve will be obvious to a person of ordinary skill in the art.

The curve 10 comprises a lower or base portion 11, to the upper part of which a slide portion 12 for a chain conveyor 13 is fastened. Optionally, the lower portion may have a shaped throat 14 at the lower part thereof to receive the return stretch of the conveyor.

The lower portion is secured to the ground by supports known in the art, not shown, whereas the upper portion 12 is secured to the lower portion by means of screws 15. The sliding portion 12 has an upper slide surface for sliding of the link flats, in which a channel 16 is formed along which the assembly of the link articulation pivots slides.

Until now a substantially known technique has been described.

In accordance with the invention, magnets 17 are fastened to the base portion 11 by screws 18, whereas the upper portion 12 forms a mere magnet cover. The upper surface of the base 11 can be flat and the lower surface of the guide portion 12 may be formed with seatings or grooves 20 for receiving the magnets.

Advantageously, magnets 17 may be made up of pairs of magnets 17a and 17b, each pair being fixed to a plate of ferromagnetic material 19, close to the side edges of the plate itself which, in turn, is fastened to the base by means of screws 18. The ferromagnetic plate carries out the lower closure of the magnetic field so as to increase the attraction effect exerted by the magnets on the conveyor links sliding along the guide 12.

Figure 2:
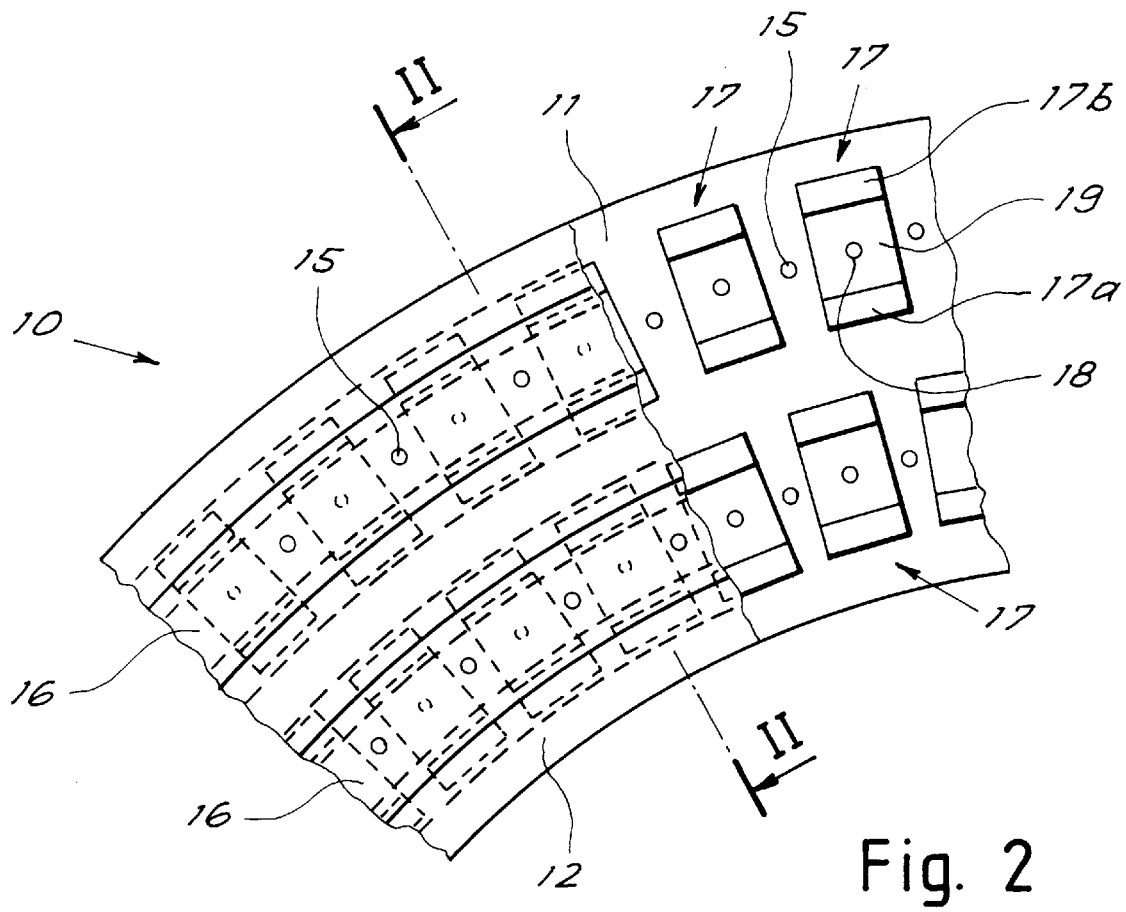
FIG. 2 is a plan view of the curve shown in FIG. 1, the upper part of it being partly removed.

As shown in FIG. 2, magnets 17 consisting of the magnet pairs 17a, 17b and plate 19, are disposed in alignment in the groove 20 (advantageously made in a continuous form) along the guide extension, with each fastening screw 15 passing between two successive magnets 17.

Operations to be carried out for the curve assembling are very simple. Actually, it is sufficient to assemble all magnets 17 by means of the respective screws 18 and subsequently fix the guide portion 12 on top of them like a cover.

When replacement of the guide portion is needed, it is sufficient to unscrew screws 15 and replace portion 12 alone, leaving the magnets in place on the base. Therefore replacement of the worn out parts is very quick and inexpensive.

At this point it is apparent that the intended purposes have been achieved.

Obviously, the above description of an embodiment applying the innovatory principles of the present invention is given for purposes of illustration only and therefore must not be considered as a limitation of the inventive scope as herein claimed.

For example, if holes or slits are wished to be eliminated from the upper guide surface, so as to avoid storing of dirt or the like therein, the screws 15 can be such arranged as to be screwed down from below, through the base, into the guide portion. It is however to note that in the described embodiment the lack of openings in the guide channel (except for the screw 15 holes) allows an excellent cleaning of the guide itself.

What is claimed is:

1. A magnetic curve for a chain conveyor having links at least partly made of a ferromagnetic material, comprising a base portion to which an upper guide portion identifying surfaces for the conveyor sliding is removably fastened, magnets being provided at the lower part of the slide surfaces for attracting the links against said surfaces, and a fastener which, independent of the upper guide portion fastens the magnets to the base portion.

2. A magnetic curve according to claim 1, wherein said magnets are made up of a pair of magnets mutually interconnected by a plate of ferromagnetic material.

3. A magnetic curve according to claim 2, wherein said magnets are fastened to the base portion by means of screws screwing down the plate to the base portion.

4. A magnetic curve according to claim 2, wherein said the base portion and guide portion are fastened to each other by means of screws disposed between successive pairs of magnets along the curve.

5. A magnetic curve according to claim 1, wherein the guide portion is provided, at the lower part thereof, with seatings for receiving magnets in a cover-like arrangement.

6. A magnetic curve according to claim 2, wherein said plate is fastened to said base.

7. A magnetic curve according to claim 1, wherein said magnets are fastened to a support and the support is fastened to the base portion.

* * * * *